(12) United States Patent
Karpukhin (10) Patent No.: US 11,011,174 B2
(45) Date of Patent: May 18, 2021

(54) METHOD AND SYSTEM FOR DETERMINING SPEAKER-USER OF VOICE-CONTROLLABLE DEVICE

(71) Applicant: YANDEX EUROPE AG, Lucerne (CH)

(72) Inventor: Ivan Aleksandrovich Karpukhin, Elektrostal (RU)

(73) Assignee: YANDEX EUROPE AG, Lucerne (CH)

( * ) Notice: Subject to any disclaimer, the term of this patent is extended or adjusted under 35 U.S.C. 154(b) by 156 days.

(21) Appl. No.: 16/534,492

(22) Filed: Aug. 7, 2019

(65) Prior Publication Data

US 2020/0194002 A1 Jun. 18, 2020

(30) Foreign Application Priority Data

Dec. 18, 2018 (RU) .......................... RU2018144800

(51) Int. Cl.
   *G10L 17/00* (2013.01)
   *G06N 20/00* (2019.01)
   *G10L 15/22* (2006.01)

(52) U.S. Cl.
   CPC .............. *G10L 17/00* (2013.01); *G06N 20/00* (2019.01); *G10L 15/22* (2013.01); *G10L 2015/223* (2013.01)

(58) Field of Classification Search
   CPC ..... G10L 17/00; G10L 15/22; G10L 2015/22; G06N 20/00
   See application file for complete search history.

(56) References Cited

U.S. PATENT DOCUMENTS

| 5,999,902 A | 12/1999 | Scahill et al. |
| 7,231,019 B2 | 6/2007 | Pascovici |
| 7,266,499 B2 | 9/2007 | Surace et al. |
| 7,590,536 B2 | 9/2009 | Bates et al. |

(Continued)

FOREIGN PATENT DOCUMENTS

| EP | 1791114 A1 | 5/2007 | |
| WO | WO-2012063360 A1 * | 5/2012 | ......... G01C 21/3608 |
| WO | 2017037445 A1 | 3/2017 | |

OTHER PUBLICATIONS

European Search Report dated Apr. 7, 2020 issued in respect of the related European Patent Application No.19217734.3.

*Primary Examiner* — Mohammad K Islam
(74) *Attorney, Agent, or Firm* — BCF LLP (57) ABSTRACT

There are disclosed methods and systems for determining a speaker of a set of registered users associated with a voice-controllable device. The method is executable by an electronic device configured to execute a Machine Learning Algorithm (MLA). The method comprises executing the MLA to determine a first probability parameter indicative of the speaker of the user utterance being one of the set of registered users; executing a user frequency analysis to generate, for each given one of the set of registered users, a second probability parameter the being an apriori frequency based probability; generating, for the electronic device, for each given one of the set of registered users an amalgamated probability based on the first probability and the second probability associated therewith; selecting the given one of the set of registered users as the speaker of the user utterance based on the amalgamated probability value.

17 Claims, 3 Drawing Sheets

(56) References Cited

U.S. PATENT DOCUMENTS

| | | |
|---|---|---|
| 8,078,884 B2 | 12/2011 | Ramakrishnan et al. |
| 8,407,051 B2 | 3/2013 | Inoue et al. |
| 8,639,508 B2 | 1/2014 | Zhao et al. |
| 8,768,838 B1 * | 7/2014 | Hoffman ............... G06Q 40/00 705/44 |
| 9,698,999 B2 * | 7/2017 | Mutagi ............... H04L 12/2829 |
| 9,766,998 B1 | 9/2017 | Sar et al. |
| 2005/0080627 A1 | 4/2005 | Hennebert et al. |
| 2006/0200463 A1 | 9/2006 | Dettinger et al. |
| 2007/0071206 A1 * | 3/2007 | Gainsboro ............... G10L 25/63 379/168 |
| 2007/0100632 A1 | 5/2007 | Aubauer et al. |
| 2009/0119103 A1 * | 5/2009 | Gerl ....................... G10L 17/04 704/243 |
| 2011/0022477 A1 | 1/2011 | Hatridge et al. |
| 2011/0286584 A1 | 11/2011 | Angel et al. |
| 2014/0039892 A1 | 2/2014 | Mills et al. |
| 2014/0046666 A1 * | 2/2014 | Nishiyama ............... G10L 17/06 704/249 |
| 2015/0154002 A1 | 6/2015 | Weinstein et al. |
| 2015/0205568 A1 * | 7/2015 | Matsuoka ............... G10L 15/00 704/246 |
| 2016/0104478 A1 | 4/2016 | Seo et al. |
| 2016/0125879 A1 * | 5/2016 | Lovitt ..................... G10L 17/24 704/275 |
| 2016/0293167 A1 | 10/2016 | Chen et al. |
| 2016/0342216 A1 | 11/2016 | Freiberg et al. |
| 2017/0270919 A1 | 9/2017 | Parthasarathi et al. |
| 2018/0033438 A1 | 2/2018 | Toma et al. |
| 2018/0182386 A1 * | 6/2018 | Lee ....................... G10L 15/14 |
| 2019/0237076 A1 * | 8/2019 | Lovitt |
| 2020/0053558 A1 * | 2/2020 | Hallock ............... H04L 9/0656 |
| 2020/0117781 A1 * | 4/2020 | Korus ................... H04W 12/60 |
| 2020/0118551 A1 * | 4/2020 | Li ........................ G10L 15/063 |
| 2020/0273457 A1 * | 8/2020 | Yamamoto ............... G10L 15/00 |

* cited by examiner

METHOD AND SYSTEM FOR DETERMINING SPEAKER-USER OF VOICE-CONTROLLABLE DEVICE

CROSS-REFERENCE

The present application claims priority to Russian Patent Application No. 2018144800, entitled "Method and System for Determining Speaker-User of Voice-Controllable Device", filed Dec. 18, 2018, the entirety of which is incorporated herein by reference.

FIELD

The present technology relates to a method and system for processing user utterance. In particular, the present technology relates to methods and systems for determining an identity of a speaker-user of a voice-controllable device.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Intelligent Personal Assistant (IPA) systems are examples of voice-controllable device. The IPA systems have been developed to perform functions in response to user requests. Such IPA systems may be used, for example, for information retrieval and navigation but are also used for simply "chatting". A conventional IPA system, such as Siri® IPA system for example, can receive a spoken user utterance in a form of digital audio signal from a device and perform a large variety of tasks for the user. For example, a user can communicate with Siri® IPA system by providing spoken utterances (through Siri®'s voice interface) for asking, for example, what the current weather is, where the nearest shopping mall is, and the like. The user can also ask for execution of various applications installed on the electronic device. As mentioned above, the user may also desire to simply and naturally "chat" with the IPA system without providing any specific requests to the system.

These personal assistants are implemented as either software integrated into a device (such as SIRI™ assistant provided with APPLE™ devices) or stand-alone hardware devices with the associated software (such as AMAZON™ ECHO™ device). The personal assistants provide an utterance-based interface between the electronic device and the user.

The range of tasks that the user can address by using the IPA is not particularly limited. As an example, the user may be able to execute a search and get an answer to her question. For example, the user is able to issue search commands by voice (for example, by saying "What is the weather today in New York, USA?"). The IPA is configured to capture the utterance, convert the utterance to text and to process the user-generated command. In this example, the IPA is configured to execute a search and determine the current weather forecast for New York. The IPA is then configured to generate a machine-generated utterance representative of a response to the user query. In this example, the IPA may be configured to generate a spoken utterance: "It is 5 degrees Celcius with the winds out of North-East".

As another example, the user is able to issue commands to control the IPA, such as for example: "Play "One Day in Your Life" by Anastacia". In response to such the command, the IPA is able to locate the locally stored song that matches the title and the performer and to play the song to the user. By the same token, if the IPA can not locate such the song stored locally, the IPA may be configured to access a remote repository of songs, such as a cloud-based storage account or an on-line song streaming service.

Other types of commands are, of course, possible. These can range from playing videos, retrieving documents, or simply "chatting" with the IPA.

SUMMARY

Developers of the present technology have appreciated certain technical drawbacks associated with the existing IPA systems.

More specifically, developers of the present technology have recognized that a typical IPA can be used in a household that has several household members. For example, a given IPA may be used in the household that has three members—two parents and a child.

All three residents at the household may be "registered users" of the IPA. For the purposes of the registration, the IPA requires each user to "provision" her or his account. In other words, each user generates a profile associated with the IPA. Such the profile may include a log in name, log in authentication credentials (such as a password or another authentication token), and a sample of a spoken utterance.

For example, the IPA may request each of the users to record a voice sample. Depending on the implementations, the IPA may request each potential user to either record a random sample utterance of a pre-determined time length (for example, the random sample of 1 or 2 minutes in duration) or read a pre-determined text (which can be a pre-determined excerpt from a book, such as "Pride and Prejudice" by Jane Austen).

Using such the pre-recorded user utterance, the IPA may be able to better process the user's spoken utterance (when in use) and/or be able to identify (and in some instances authenticate) the user. The later can be convenient when the IPA processes user's request (in use). By being able to identify a specific one of the multiple potential users (in this example—three), the IPA may be able to better tailor/customize the response that the IPA provides to the individual user's spoken request.

The ability to identify (and potentially authenticate) the given user of the set of registered users associated with the IPA (in this example—three users) may further allow the IPA to manage access privileges, which may be particularly useful (but not so limited) in those implementations where each of the registered users is associated with his or her own pre-authorized set of voice-based actions.

Developers of the present technology have recognized that the identification of the given user of the plurality of potential users may be a challenging task. Considering that both the registration sample of the user's utterance and the actual in-use voice command tend to be relatively short in duration, the identification of the given user using the relatively short sample utterance and the relatively short in-use utterance may be technologically challenging.

This issue may be further exacerbated by the fact that the IPA may be used by "guests", i.e. users that are not otherwise registered with the IPA. Some of these guests may be relatively frequent users, for example, when a given person visits the household on several occasions and uses the IPA while visiting. On the other hand, such guest may be an infrequent visitor or even be a one off user of the IPA.

The latter is particularly true in those circumstances where the IPA may be located by an open window of a one-family dwelling. It may happen that the IPA captures a user utterance of a by-passer walking past the open window. The IPA needs to be able to recognize that the spoken utterance has been generated by a guest who is not authorized the IPA.

Broadly speaking, developers of the present technology have developed non-limiting embodiments thereof based on a premise that the IPA may be able to more correctly identify the given user-speaker of the IPA by generating an amalgamated probability parameter of the given one of the plurality of registered users being the originator of the spoken utterance received at a given point in time. The amalgamated probability parameter is based on the first probability and the second probability associated therewith.

The first probability and the second probability can be generated as follows, at least in some non-limiting embodiments of the present technology.

The IPA is configured to execute, a Machine Learning Algorithm (MLA), the MLA having been trained to analyze voice features of the user utterance to generate, for each given one of the set of registered users, the first probability of the speaker of the user utterance being the given one of the set of registered users.

The IPA is further configure to execute a user frequency analysis of the use of the voice-controllable device by each given one of the set of registered users to generate, for each given one of the set of registered users, the second probability, the second probability being an apriori frequency based probability.

The IPA can then select the given one of the set of registered users as the speaker of the user utterance, the given one being associated with a highest value of the amalgamated probability value.

As such, in accordance with a first broad aspect of the present technology, there is provided a method of determining a speaker, the speaker selectable from a set of registered users associated with a voice-controllable device. The method is executable by an electronic device configured to execute a Machine Learning Algorithm (MLA). The method comprises: receiving, by the electronic device, an indication of a user utterance, the user utterance having been produced by the speaker; executing, by the electronic device the MLA, the MLA having been trained to analyze voice features of the user utterance to generate, for each given one of the set of registered users, a first probability parameter indicative of the speaker of the user utterance being the given one of the set of registered users; executing, by the electronic device, a user frequency analysis of the use of the voice-controllable device by each given one of the set of registered users to generate, for each given one of the set of registered users, a second probability parameter, the second probability parameter being an apriori frequency based probability; generating, for the electronic device, for each given one of the set of registered users an amalgamated probability based on the first probability and the second probability associated therewith; selecting, by the electronic device, the given one of the set of registered users as the speaker of the user utterance, the given one being associated with a highest value of the amalgamated probability value.

In some implementations of the method, the electronic device is one of the voice-controllable device and a server coupled to the voice-controllable device via a communication network.

In some implementations of the method, the set of registered users comprises a registered user and a guest user, and wherein the selecting comprises: comparing the amalgamated probability of each one of the set of registered users to a pre-determined threshold; in response to each one of the amalgamated probabilities being below the pre-determined threshold, determining that the speaker is the guest user; in response to at least one of the amalgamated probabilities being above the pre-determined threshold executing: the selecting the registered user as the speaker of the user utterance, the registered user being associated with the highest value of the amalgamated probability value.

In some implementations of the method, the method further comprises: based on the determination of the speaker, updating the apriori frequency based probability associated with each given one of the set of registered users; and storing updated an apriori frequency based probabilities in a memory associated with the electronic device.

In some implementations of the method, the method further comprises retrieving a user profile associated with the speaker and providing the speaker with a set of authorized voice-based actions.

In some implementations of the method, the method further comprises retrieving a user profile associated with the one of the guest user and the registered user that has been determined to be the speaker and providing a set of authorized voice-based actions, and wherein the set of voice-based actions associated with the guest user is smaller that the set of voice-based actions associated with the registered user.

In some implementations of the method, the method further comprises maintaining a database of apriory probabilities for each one of the set of registered users.

In some implementations of the method, the method further comprises updating the apriori probabilities for at least some of the set of registered users based on the selecting.

In some implementations of the method, the user frequency analysis weighs a sub-set of apriori probability for each one of the set of registered users, the sub-set including a pre-determined number of more recent past calculations.

In some implementations of the method, the set of registered users comprises a registered user and a guest user, and wherein the method further comprises setting a pre-determined minimum value of the apriori probability under which the apriori probability for the guest user can not drop.

In some implementations of the method, the setting the pre-determined minimum value is based on a number of registered users of the set of registered users and wherein the pre-determined minimum value is no higher than any one of the apriori probabilities of any of the registered users of the set of registered users.

In some implementations of the method, the method further comprises maintaining a database of past rendered determined identities of speakers.

In some implementations of the method, the set of registered users comprises a registered user and a guest user, and wherein in response to a pre-determined number of past rendered determined identities of speakers being the guest speaker, the method further comprises executing a pre-determined guest scenario.

In some implementations of the method, the executing the pre-determined guest scenario comprises, during a future execution of the executing the MLA having been trained to analyze voice features of the user utterance to generate, for each given one of the set of registered users, the first probability of the speaker of the user utterance being the given one of the set of registered users: artificially decreasing the amount of time spent during the generation of the first probability.

In some implementations of the method, the method further comprises: retrieving past rendered determined identities of speakers; updating the prediction of the identities of speakers using the current values of apriori probabilities; storing the updated apriori probabilities.

In some implementations of the method, the method further comprises comparing the updated apriori probabilities with the past rendered determined identities of speakers and using the determined differences for additional training of the MLA.

In accordance with another broad aspect of the present technology, there is provided an electronic device comprising: a processor configured to execute e a Machine Learning Algorithm (MLA); a memory coupled to the processor, the memory storing computer executable instructions, which instructions when executed cause the processor to: receive an indication of a user utterance, the user utterance having been produced by a speaker using a voice-controllable device, the speaker selectable from a set of registered users associated with the voice-controllable device; execute the MLA, the MLA having been trained to analyze voice features of the user utterance to generate, for each given one of the set of registered users, a first probability parameter indicative of the speaker of the user utterance being the given one of the set of registered users; execute a user frequency analysis of the use of the voice-controllable device by each given one of the set of registered users to generate, for each given one of the set of registered users, a second probability parameter, the second probability parameter being an apriori frequency based probability; generate for each given one of the set of registered users an amalgamated probability based on the first probability and the second probability associated therewith; select the given one of the set of registered users as the speaker of the user utterance, the given one being associated with a highest value of the amalgamated probability value.

In some implementations of the electronic device, the electronic device being one of the voice-controllable device and a server coupled to the voice-controllable device via a communication network.

In accordance with another broad aspect of the present technology, there is provided a method of determining a speaker, the speaker selectable from a set of registered users associated with a voice-controllable device. The method is executable by an electronic device configured to execute a Machine Learning Algorithm (MLA). The method comprises: executing the MLA to determine a first probability parameter indicative of the speaker of the user utterance being one of the set of registered users; executing a user frequency analysis to generate, for each given one of the set of registered users, a second probability parameter the being an apriori frequency based probability; generating, for the electronic device, for each given one of the set of registered users an amalgamated probability based on the first probability and the second probability associated therewith; selecting the given one of the set of registered users as the speaker of the user utterance based on the amalgamated probability value.

In the context of the present specification, unless specifically provided otherwise, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, a "client device" is an electronic device associated with a user and includes any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a computing device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "computing device" is any electronic device capable of running software appropriate to the relevant task at hand. A computing device may be a server, a client device, etc.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever, comprising information capable of being stored in a database. Thus information includes, but is not limited to audiovisual works (photos, movies, sound records, presentations etc.), data (map data, location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the expression "text" is meant to refer to a human-readable sequence of characters and the words they form. A text can generally be encoded into computer-readable formats such as ASCII. A text is generally distinguished from non-character encoded data, such as graphic images in the form of bitmaps and program code. A text may have many different forms, for example it may be a written or printed work such as a book or a document, an email message, a text message (e.g., sent using an instant messaging system), etc.

In the context of the present specification, unless specifically provided otherwise, the expression "acoustic" is meant to refer to sound energy in the form of waves having a frequency, the frequency generally being in the human hearing range. "Audio" refers to sound within the acoustic range available to humans. "Speech" and "synthetic speech" are generally used herein to refer to audio or acoustic, e.g., spoken, representations of text. Acoustic and audio data may have many different forms, for example they may be a recording, a song, etc. Acoustic and audio data may be stored in a file, such as an MP3 file, which file may be compressed for storage or for faster transmission.

In the context of the present specification, unless specifically provided otherwise, the expression "neural network" is meant to refer to a system of programs and data structures designed to approximate the operation of the human brain. Neural networks generally comprise a series of algorithms that can identify underlying relationships and connections in a set of data using a process that mimics the way the human brain operates. The organization and weights of the connections in the set of data generally determine the output. A neural network is thus generally exposed to all input data or parameters at once, in their entirety, and is therefore capable of modeling their interdependencies. In contrast to machine learning algorithms that use decision trees and are therefore constrained by their limitations, neural networks are unconstrained and therefore suited for modelling interdependencies.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
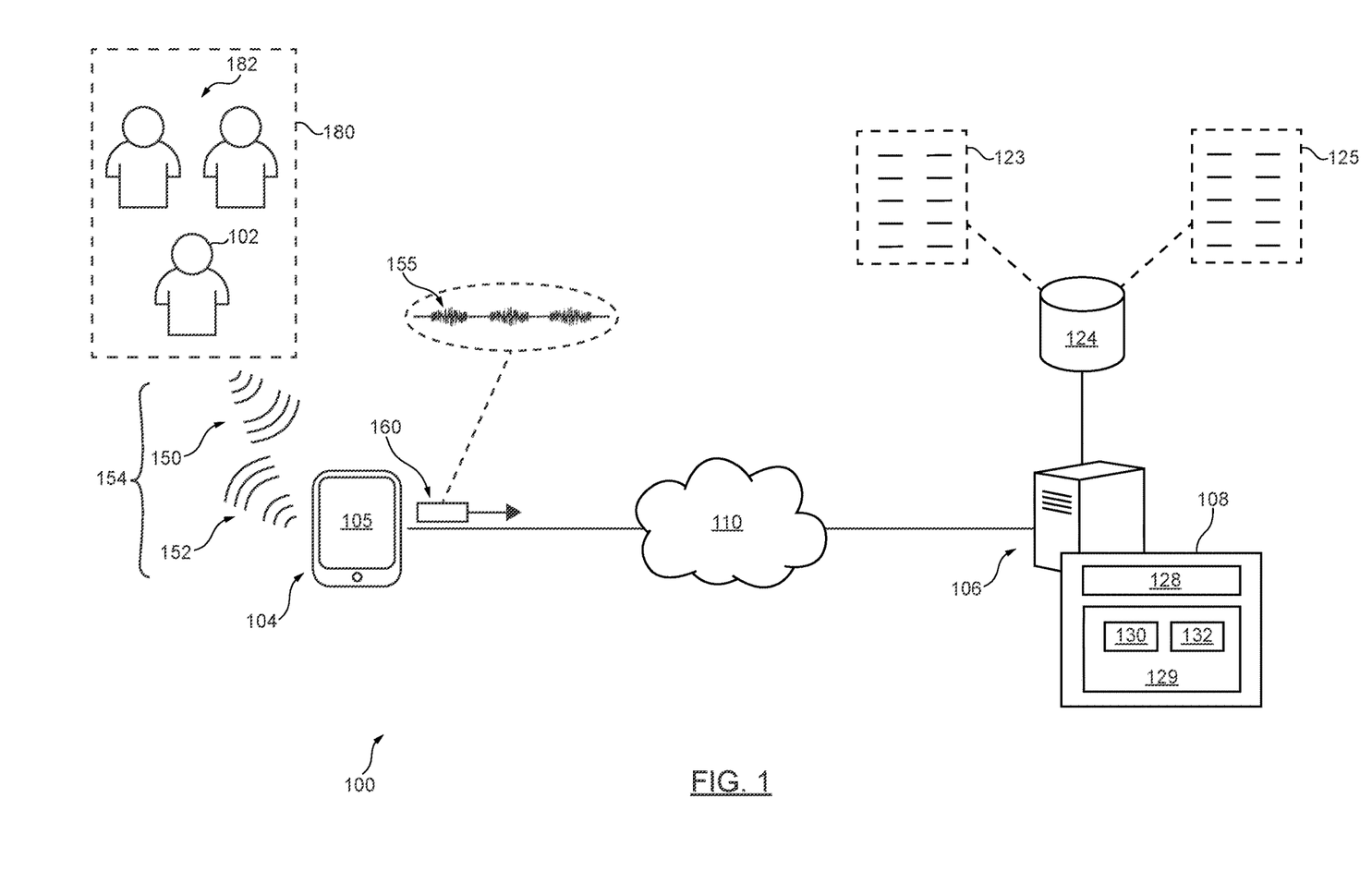
FIG. 1 is a schematic diagram of a system implemented in accordance with a non-limiting embodiment of the present technology.

Referring to FIG. 1, there is depicted a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive user-spoken utterances, to process user-spoken utterances, and to generate machine-generated utterances (for example, in response to the user-spoken utterance being of a "chat" type). The example implementation of the system 100 is directed to an environment where interaction between the user and the electronic device is implemented, at least in part, via an utterance-based interface. In other words, to an environment having at least one voice-controllable electronic device. It should be noted that in accordance with the non-limiting embodiments of the present technology, the term "utterance" is meant to denote either a complete user-spoken utterance, a portion (fragment) of the user-spoken utterance, or a collection of several user-spoken utterances.

It should be noted however that embodiments of the present technology are not so limited. As such, methods and routines described herein can be implemented in any variation of the system 100 where it is desirable to identify an originator of user-spoken utterance directed to an electronic device by processing the user-spoken utterance.

Within the illustration of FIG. 1, the system 100 is configured to execute at least one of: (i) providing machine-generated responses to user queries, which can be said to result in a "conversation" between a given user and a given electronic device and (ii) execute actions based on user's produced spoken utterances having commands to control the system 100.

For example, sound indications 150 (such as spoken utterances) from a user 102 may be detected by an electronic device 104, which, in response, is configured to provide sound indications 152 (such as spoken utterances or "machine-generated utterances") and/or to execute actions based on the commands contained in the sound indications 152.

As such, in at least some non-limiting embodiments of the present technology, the interaction between the user 102 and the electronic device 104 can be said that this results in a conversation 154 between the user 102 and the electronic device 104, where the conversation 154 is composed of (i) the sound indications 150 and (ii) the sound indications 152.

In at least some other non-limiting embodiments of the present technology, the interaction between the user 102 and the electronic device 104 can result in the electronic device 104 executing at least one action based on the based on the commands contained in the sound indications 152.

For example, where the sound indications 150 contained a command to play a particular song, the sound indications 152 could contain the played song. Alternatively or additionally, the action can include performing a search and outputting a search result via the sounds indications 152, turning the electronic device 104 on or off, controlling volume of the electronic device 104, and the like.

It should be noted, however, that the output of the electronic device 104 does not need to be in the form of the sound indications 152 in each and every embodiment of the present technology. As such, it is contemplated that in alternative non-limiting embodiments of the present technology, the output of the electronic device 104 can be in a different form, such as visually on a screen, a printer, another output device and the like. By the same token, by the present description it is not meant to say that the electronic device 104 can receive user commands exclusively by means of the sound indications 150. As such, it is contemplated that the electronic device 104 can also receive user commands by means of other input devices, such as a touch sensitive screen, a key board, a touch pad, a mouse, and the like.

User Device

As previously mentioned, the system 100 comprises the electronic device 104. The implementation of the electronic device 104 is not particularly limited, but as an example, the electronic device 104 may be implemented as a personal computer (desktops, laptops, netbooks, etc.), a wireless communication device (such as a smartphone, a cell phone, a tablet, a smart speaker and the like), and the like. As such, the electronic device 104 can sometimes be referred to as an "electronic device", "end user device", "client electronic device" or simply "device". It should be noted that the fact that the electronic device 104 is associated with the user 102 does not need to suggest or imply any mode of operation— such as a need to log in, a need to be registered, or the like.

It is contemplated that the electronic device 104 comprises hardware and/or software and/or firmware (or a combination thereof), as is known in the art, in order to (i) detect or capture the sound indications 150 and (ii) to provide or reproduce the sound indications 152. For example, the electronic device 104 may comprise one or more microphones (not depicted) for capturing the sound indications 150 and one or more speakers (not depicted) for providing or reproducing the sound indications 152.

The electronic device 104 also comprises hardware and/or software and/or firmware (or a combination thereof), as is known in the art, in order to execute an intelligent personal assistant (IPA) application 105. Generally speaking, the purpose of the IPA application 105, also known as a "chatbot", is to (i) enable the user 102 to submit queries or commands in a form of spoken utterances (e.g., the sound indications 150) and, in response, (ii) provide to the user 102 responses in a form of spoken utterances (e.g., the sound indications 152) and/or execute actions based on the commands contained in the sound indications 150. Submission of queries/commands and provision of responses may be executed by the IPA application 105 via what is known as "a natural language user interface" (not separately depicted).

Generally speaking, the natural language user interface of the IPA application 105 may be any type of computer-human interface where linguistic phenomena such as words, phrases, clauses and the like act as user interface controls for extracting, selecting, modifying or otherwise generating data in or by the IPA application 105.

For example, when spoken utterances of the user 102 (e.g., the sound indications 150) are detected by the electronic device 104, the IPA application 105 may employ its natural language user interface in order to analyze the spoken utterances of the user 102 and extract data therefrom, which data is indicative of queries or commands of the user 102.

Also, data indicative of responses to be provided to the user 102, which may be received or generated by the electronic device 104, is analyzed by the natural language user interface of the IPA application 105 in order to provide or reproduce spoken utterances (e.g., the sound indications 152) indicative of the responses to the user queries or commands.

Communication Network

In the illustrative example of the system 100, the electronic device 104 is communicatively coupled to a communication network 110 for accessing and transmitting data packets to/from a server 106 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the electronic device 104 and the communication network 110 is implemented will depend inter alia on how the electronic device 104 is implemented.

Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

In some non-limiting embodiments of the present technology, the IPA application 105 is configured to transmit the captured user's spoken utterance (that was part of the sound indications 150) to the server 106. This is depicted in FIG. 1 as a signal 160 transmitted from the electronic device 104 to the server 106 via the communication network 110. The signal 160 comprises a recording of a spoken utterance captured by the electronic device 104 and depicted in FIG. 1 at 155.

In some non-limiting embodiments of the present technology, the transmittal of the signal 160 and the recording of the spoken utterance 155 contained therein to the server 106 enables the server 106 to process the recording of the spoken utterance 155 to extract commands contained therein and to generate instructions to enable the electronic device 104 to execute actions that are responsive to the user commands.

It should be noted that in alternative non-limiting embodiments of the present technology, the processing of the recording of the spoken utterance 155 (or more broadly of the sound indications 150) can be executed locally by the electronic device 104. In these alternative non-limiting embodiments of the present technology, the system 100 can be implemented without the need for the server 106 or the communication network 110 (although, they may still be present for back up functionality or the like). Within these alternative non-limiting embodiments of the present technology, the functionality of the server 106 to be described herein below can be implemented as part of the electronic device 104.

In these alternative non-limiting embodiments of the present technology, the electronic device 104 comprises the required hardware, software, firmware or a combination thereof to execute such functionality, as will be described herein below with reference to operation of the server 106.

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to (i) receive data indicative of queries or commands from the electronic device 104, (ii) analyze the data indicative of queries or commands and, in response, (iii) generate data indicative of machine-generated responses and (iv) transmit the data indicative of machine-generated responses to the electronic device 104. To that end, the server 106 hosts an IPA service 108 associated with the IPA application 105.

The IPA service 108 comprises various components that may allow implementing the above-mentioned functionalities thereof.

The IPA service 108 may implement a natural language processor 128. The natural language processor 128 may be configured to: (i) receive the signal 160; (ii) to retrieve the recording of the spoken utterance 155 contained therein; (iii) to process the spoken utterance 155 to extract user commands that were issues as part of the sound indications 150.

To that end, the natural language processor 128 is configured to convert speech to text using a speech to text algorithm (not depicted). In accordance with the various non-limiting embodiments of the present technology, the speech to text algorithm may be based on one or more of: hidden Markov models, dynamic time wrapping (DTW) based speech recognition algorithms, end to end automatic speech recognition algorithms, various Neural Networks (NN) based techniques, and the like.

In accordance with the non-limiting embodiments of the present technology, the IPA service 108 of the server 106 is further configured to execute a speaker determination routine 129. The speaker determination routine 129 is configured to execute a first analysis module 130 and a second analysis module 132.

As an illustration of the functionality of the non-limiting embodiment of the speaker determination routine 129, let it be assumed that the electronic device 104 is located in a household that is associated with a set of users 180 (who can also be thought of a "the set of registered users 180"). The set of users 180 includes the user 102, the user 102 being a "first user" 102, as well as a set of additional users 182, of which only two are depicted in FIG. 1. However, it should be understood that the set of users 180 can have fewer or more members at any given location of the electronic device 104.

In other words, the set of users 180 contains three users—the first user 102 and the set of additional users 182, which continuing with the example presented above can be the two parents and the child.

It is noted that each of set of users 180 is a registered user of the IPA application 105 executed by the electronic device 104. To that end, each one of the set of users 180 has undergone a registration process executed by the IPA application 105. The registration process is also sometimes referred to by those skilled in the art as an "enrollment" process. The exact implementation of the registration process is not particularly limited.

Figure 2:
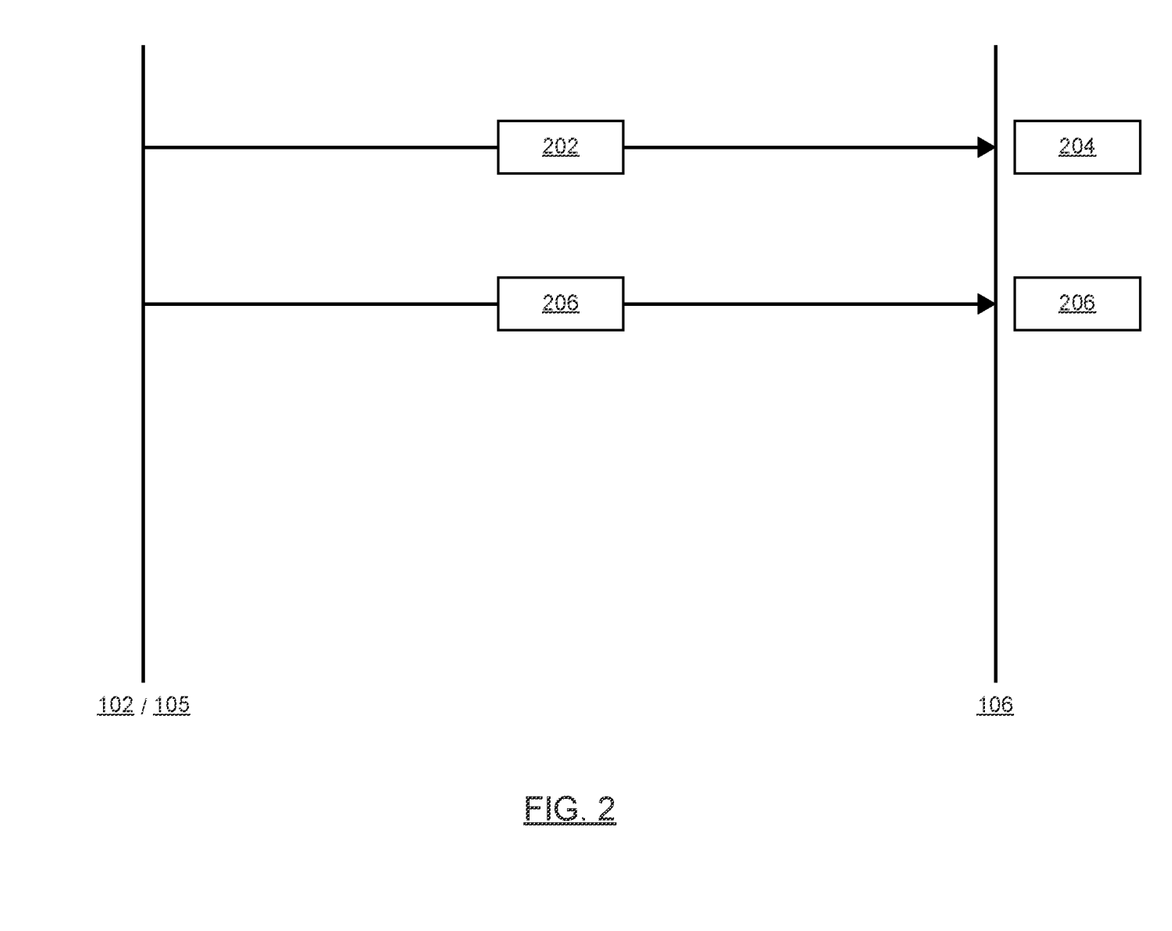
FIG. 2 depicts a signal flow chart that illustrates a registration process implemented in the system of FIG. 1, which registration process is implemented in accordance with the various non-limiting embodiments of the present technology.

A non-limiting example of the implementation of a registration process 200 is depicted with reference to FIG. 2, which depicts a signal flow chart that illustrates the registration process, which is implemented in accordance with the various non-limiting embodiments of the present technology. The description of FIG. 2 will be presented using the example of the first user 102 using the IPA application 105. However, the registration process can be implemented substantially similar for the other users of the set of users 180.

As part of a step 202, the first user 102 of the set of users 180 provides log in credentials 204. The log in credentials 204 can take form of a user name and a password combination, or any other suitable implementation thereof. The log in credentials 204 can be provided by either a spoken utterance (as part of the spoken utterance 155, which is then transmitted to the server 106 as the signal 160), entered using a key board (not depicted) associated with or connected to the electronic device 104, or using any other type of input-output device associated with the electronic device 104 or the first user 102.

The server 106 then creates a record associated with the first user 102 in association with the so-provided log in credentials 204. In some non-limiting embodiments of the present technology, the server 106 creates the record associated with the log in credentials 204 in a database 124. The database 124 can be hosted by the server 106 or be otherwise accessible by the server 106.

For example, the server 106 can maintain a user-record repository 123 on the database 124. The user-record repository 123 can include a plurality of records (not separately numbered) for maintaining a list of log in credentials 204 of the registered users of the set of users 180.

As part of a step 306, the first user 102 of the set of users 180 provides a voice sample 206. The voice sample 206 can be received by means of the IPA application 105 requesting (for example, by means of the sound indications 152) the first user 102 to record a voice sample (for example, by means of the sound indications 150).

Depending on the non-limiting implementation, the IPA application 105 may request the first user 102 to either record a random sample utterance of a pre-determined length or read a pre-determined text.

The natural language processor 128 of the server 106 receives the voice sample 206 (for example, in the form of the signal 160) and stores the voice sample 206 in the database 124. In some non-limiting embodiment of the present technology, the natural language processor 128 of the server 106 stores the voice sample 206 in association with the record that has been created in association with the log in credentials 204 in the user-record repository 123 of the database 124.

Given the scenario presented above and in accordance with the non-limiting embodiments of the present technology, as the result of execution of the speaker determination routine 129, the server 106 is configured to identify, based on a received in-use user spoken utterance (such as the spoken utterance produced by one of the set of the users 180 and received by the IPA service 108 in the form of the sound indications 150 and transmitted to the server 106 as the recording of the spoken utterance 155 within the signal 160), which one of the set of users 180 has issued the spoken utterance.

To that end and in accordance with the non-limiting embodiments of the present technology, the speaker determination routine 129 is configured to execute a first analysis module 130 and a second analysis module 132.

The first analysis module 130 is configured to generate a first probability parameter. To that end the first analysis module 130 is configured to execute a Machine Learning Algorithm (MLA), the MLA having been trained to analyze voice features of the user utterance to generate, for each given one of the set of users 180, a first probability of the speaker of the user utterance being the given one of the set of users 180.

The MLA implemented by the first analysis module 130, broadly speaking, is a computer-based algorithm that can "learn" from training data and make predictions based on in-use data. The MLA is usually trained, during a training phase thereof, based on the training data to, in a sense, "learn" associations and/or patterns in the training data for making predictions, during an in-use phase thereof, based on the in-use data.

More specifically, the MLA executed by the first analysis module 130 is trained, based on the features of the user utterance, such as analysis of the vocal features of the user utterance. The vocal features of the user utterances include but are not limited to: intonation, volume, pitch, stress, spectral patterns and the like. In accordance with the non-limiting embodiments of the present technology, the first analysis module 130 may also include a filter bank, which may comprise a set (an array) of band-pass filters that separates the input signal into multiple components, each one carrying a single frequency sub-band of the user spoken utterance.

In accordance with the non-limiting embodiments of the present technology, the MLA executed by the first analysis module 130 is configured to generate a vector representative of the vocal features of the in-use user spoken utterance. The MLA executed by the first analysis module 130 may be further configured to compare the so-generated vector representative of the in-use spoken utterance to vectors of stored voice samples 206 from the database 124.

Broadly speaking, the first analysis module 130 can implement an Artificial Neural network (ANN), which is configured to generate and analyze voiceprints. In other embodiments of the present technology, the first analysis module 130 can be implemented as a Convolutional Neural Network (CNN), which can generate vectors representation of voice features. In alternative non-limiting embodiments of the present technology, the first analysis module can be implemented as a Deep Neural Network (DNN).

Thus, the MLA executed by the first analysis module 130 is configured to generate a first probability parameter, based on the analysis of voice features of the in-use spoken utterance and the stored voice samples 206. The first probability parameter is indicative of a probability of the speaker of the user utterance being the given one of the set of users 180. In other words, recalling that in this example the set of users 180 comprises three users (the first user 102 and two of the set of additional users 182), the MLA executed by the first analysis module 130 is configured to generate, for each one of the set of users 180, a respective first probability parameter indicative of how likely the given one of the set of users 180 to be the speaker who originated the current in-use utterance.

In some embodiments of the present technology, the first analysis module 130 can first calculate the first probability parameter using the following formula:

$$PrM(V1,V2)=P(\text{same})/P(\text{different}) \quad \text{Formula 1}$$

Where the PrM (V1, V2) is a value representation of an amalgamated probability of any two vectors (such as a vector of the current spoken utterance and a vector of a stored voice sample 206) matching; P(same) is a probability of them being the same; and P(different) is the probability of them being different. It should be noted that in accordance with the non-limiting embodiments of the present technology, the first probability parameter, in a sense, is a rate of likelihoods of the current speaker being the given one that has a pre-recorded sample or a guest. In some alternative non-limiting embodiments of the present technology, alternatively the first analysis module 130 can use a model which returns the value of P(same) and can calculate P(different) as "1−P(same)".

As an example, the MLA executed by the first analysis module 130 can generate the likelihood rates (first probabilities) as follows:

P1 (same for the First User 102)→0.89
P1 (same for a first of the Set of Additional Users 182)→3.8
P1 (same for a second of the Set of Additional Users 182)→0.21

Table 1. First likelihood rates.

As illustrated by the above non-limiting example, the MLA executed by the first analysis module 130 is configured to generate, for each one of the first user 102 and two of the set of additional users 182, a respective first probability parameter indicative of how likely the given one of the set of users 180 to be the speaker who originated the current in-use utterance, which first parameters are respectively 0.89, 3.8 (which may be higher than a full 1 probability) and 0.21.

In this example, the MLA executed by the first analysis module 130 has determined that based on the analyzed vocal features of the spoken utterance, it is more likely that the originator of the spoken utterance is the first user 102 (with the confidence of 89 percent), and that the remainder of the set of users 180 is less likely to be the originator of the spoken utterance (respective confidence levels of 28 percent and 21 percent for the other two of set of additional users 182 of the set of users 180).

In at least some non-limiting embodiments of the present technology, the MLA executed by the first analysis module 130 is further configured to generate a first probability parameter associated with a "guest user". The first probability parameter associated with the guest user is indicative of the probability of the originator of the current spoken utterance being neither one of the set of users 180. In other words, in accordance with at least some of the non-limiting embodiments of the present technology, the guest user can be considered to be a non-registered user of the electronic device 104. Or in other words, the guest user can be considered to be a user who has not undergone the registration process described in association with FIG. 2.

In some of the non-limiting embodiments of the present technology, the MLA executed by the first analysis module 130 is configured to determine the first probability parameter for the guest user in a way similar to how the MLA executed by the first analysis module 130 determines the first probability parameter for any other user of the set of users 180 (for example, by generating the vector for the current spoken utterance and determining that the vector is different from vectors of all the stored voice samples 206).

The second analysis module 132 is configured to execute a user frequency analysis of the use of the electronic device 104 by each given one of the set of users 180 to generate, for each given one of the set of users 180, a second probability parameter. The second probability parameter is an apriori frequency based probability.

In those non-limiting embodiments of the present technology, where the MLA executed by the first analysis module 130 has also generated the first probability parameter for the guest user, the second analysis module 132 is further configured to generate the second probability parameter associated with the guest user.

In some non-limiting embodiments of the present technology, the second analysis module 132 is configured to maintain a user counter repository 125. The user counter repository 125 can be maintained, for example, on the database 124. In accordance with the non-limiting embodiments of the present technology, the second analysis module 132 is configured to increment a given counter record associated with a given one of the set of users 180, when the given one of the set of users 180 is determined to have used the electronic device and, more particularly, has interacted with the IPA application 105.

In other words, as will be appreciated upon reading of the teachings presented herein, once it is determined that the given user of the set of users 180 has interacted with the IPA application 105 (based on the first probability parameter described above, a second probability parameter and an amalgamated probability parameter to be described herein below), the second analysis module 132 increments the associated counter record of the user counter repository 125.

In accordance with the non-limiting embodiments of the present technology, the second analysis module 132 is configured to execute the user frequency analysis of the use of the electronic device 104 by analyzing the user counter repository 125 to determine, for each of the set of users 180, the second probability parameter being based on historical frequency of use statistical information. In other words, the second analysis module 132 determines the second probability parameter based on how likely, based on historical statistical information, a given one of the set of users to be the current originator of the spoken utterance.

In some embodiments of the present technology, the second analysis module 132 is configured to execute the user frequency analysis of the use of the electronic device 104 by analyzing the entire historic data stored in the user counter repository 125 in association with the set of users 180 associated with the electronic device 104 and the IPA application 105.

In other embodiments of the present technology, the second analysis module 132 is configured to execute the user frequency analysis of the use of the electronic device 104 by analyzing a subset of data stored the user counter repository 125 in association with the set of users 180 associated with the electronic device 104 and the IPA application 105. For example, the second analysis module 132 is configured to extract data associated with a pre-determined past period of time, such as past month, past two weeks, past day and the like.

In some non-limiting embodiments of the present technology, the second analysis module 132 is configured to extract entire data, but to weight more recent information more than older information, for example, weight past week information more compared to the remainder older information. In other words, in some non-limiting embodiments of the present technology, the second analysis module can assign a higher weight to certain portion of the stored data indicative of the past usage of the electronic device 104 and/or the IPA application 105. In some non-limiting embodiments of the present technology, the second analysis module 132 can also have access to past calculated first probability value and second probability value, together with timestamps when such values were calculated.

Let it be assumed that the historic data stored in the user counter repository 125 in association with the set of users 180 associated with the electronic device 104 and the IPA application 105 for the relevant period of time indicated, as follows:

First User 102→25
The first of the Set of Additional Users 182→5
The second of the Set of Additional Users 182→13
Guest User→1
   Table 2. Historic visits count.

As such, the second analysis module 132 is configured to execute the user frequency analysis of the use of the electronic device 104 and to determine the second probability parameter being an apriori probability of the given one of the set of users 180 being the originator of the current spoken utterance:

P2 (Current User=the First User 102)→0.57
P2 (Current User=a first of the Set of Additional Users 182)→0.12
P2 (Current User=a second of the Set of Additional Users 182)→0.30
P2 (Current User=a Guest User)→0.01
   Table 3. Second probability parameter.

The second analysis module 132 is further configured to generate for each given one of the set of users 180 an amalgamated probability parameter based on the first probability and the second probability associated therewith. In some non-limiting embodiments of the present technology, the amalgamated probability parameter is generated by multiplication of the respective first parameter and the second parameter. However, any other suitable function can be used. In some embodiments of the present technology, the resultant amalgamated probability can be normalized, such that each one of the amalgamated probabilities is in the range of zero to one; with all the calculated amalgamated probabilities adding up to one.

PA (Current User=the First User 102)→0.8
PA (Current User=a first of the Set of Additional Users 182)→0.1
PA (Current User=a second of the Set of Additional Users 182)→0.1
PA (Current User=a Guest User)→0.0

Table 4. Amalgamated probability parameter.

The second analysis module 132 is further configured to select the given one of the set of users 180 as the speaker of the current user utterance, the given one being associated with a highest value of the amalgamated probability value. In the example illustrated above, the second analysis module 132 selects the first user 102 as the current originator of the spoken utterance.

Uses of the so-identified identity of the originator of the spoken utterance.

In some non-limiting embodiments of the present technology, the identity of the identifier originator of the current spoken utterance (i.e. the first user 102, in this example) can be used to implement or enhance implementation of the functionality of the electronic device 104.

In some non-limiting embodiments of the present technology, the natural language processor 128 can use the knowledge of the identified speaker to retrieve a user profile associated with the identified speaker (i.e. associated with the first user 102). This can be executed, for example, in order to provide the speaker with a set of authorized voice-based actions, which are specifically selected based on the user profile of the first user. The indication of such user profile and the list of authorized voice-based actions can be stored in the user-record repository 123.

Thus, it is contemplated that the natural language processor 128 is further configured to retrieve a user profile associated with the first user 102 (identified as the originator of the current spoken utterance) from the user-record repository 123.

In some embodiments of the present technology, maintaining of the user profiles and the list of authorized voice-based actions may allow distinguishing between what some or all of the users of the set of users 180 are allowed to do and what guest users allowed to do.

For example, it is contemplated, that some or all of the users of the set of users 180 can provision the list of actions that they or other ones of the set of users 180 can execute using the electronic device 104. It is also envisioned that a guest user profile can be maintained by the user-record repository 123 and that the set of voice-based actions associated with the guest user is smaller that the set of voice-based actions associated with any or some of the registered user (i.e. one of the set of users 180).

The natural language processor 128 can be further configured to update the user counter repository 125 to increment a counter associated with the first user 102 (who has been determined to be the speaker/originator of the current spoken utterance).

More specifically, based on the determination of the speaker, the natural language processor 128 may be configured to update the apriori frequency based probability associated with each given one of the set of registered users; and to store the updated apriori frequency based probabilities in the user counter repository 125. More specifically, the natural language processor 128 updates the counter associated with the current speaker to increase his or her apriori probability parameter.

In some non-limiting embodiments of the present technology, the apriori probability parameter associated with a guest user may be associated with an absolute minimum value to ensure that the guest user can be determined. In some implementations, the minimum value for the apriori probability parameter for the guest user can be a function of the total number of the registered users of the set of users 180. In some non-limiting implementations, this pre-determined minimum value can not be higher than the probabilities of the registered user's probabilities.

Alternative Embodiments—Updating Apriori Probability and Managing Guest User Probability In some non-limiting embodiments of the present technology, the determination of the current speaker may be used to update and/or to re-adjust past determined apriori user probabilities.

In some non-limiting embodiments of the present technology, after the set of users 180 have undergone the registration process as described above and before the electronic device 104 is used for the first time, each of the users of the set of users 180 is assigned with a pre-determined apriori probability parameter. As an example, the so-pre-assigned parameter can be 1 or 0.5. By the same token, the guest user can be also assigned the apriori probability parameter, such as 0.25 or 0.5; which value depends on the number of registered users of the set of users 180. For example, the value of the apriori probability parameter assigned to the guest user can be lower than any of the apriori probability parameter assigned to the registered users of the set of users 180.

During the first couple of cycles of the use of the electronic device 104 (while not enough statistical information has been collected), the predictions made by the first analysis module 130 will in effect "win" or "prevail", as they are not being "moderated" by the output of the second analysis module 132.

After some time of use of the electronic device 104, the speaker determination routine 129 collects enough statistical information of who of the set of users 180 are using the IPA application 105 of the electronic device 104, the output of the output of the second analysis module 132 starts to have the "moderating" effect, as has been described above.

In some non-limiting embodiments of the present technology, the natural language processor 128 can use current determinations of the originator of the spoken utterances to "correct" past predictions and use the information to further train the second analysis module 132. In a sense, the natural language processor 128 can execute review, filtering and re-learning based on the past predictions.

In some non-limiting embodiments of the present technology, the natural language processor 128 can further execute clustering of the stored voice samples 206. In some non-limiting embodiments of the present technology, the natural language processor 128 can analyze the so-clustered stored voice samples 206. For example, large clusters can be associated with registered users of the set of users 180, while smaller cluster(s) can be associated with guest user(s).

The organization of the stored voice samples 206 into clusters can be executed by the natural language processor 128 based on the number of collected information points about a given one of the set of users 180 or the guest user. The more the natural language processor 128 knows about the given user (i.e. one of the set of users 180 or the guest user)—the associated cluster gets larger and more accurate.

The clustered stored voice samples 206 can be inputted into another MLA model (not depicted) for recalculation or training future predictions. In some embodiments of the present technology, as the natural language processor 128 obtains more information abut the guest user, the guest user may get associated, by the natural language processor 128, with a guest profile, be assigned a pseudo-user key or be invited to undergo a registration process.

In some non-limiting embodiments of the present technology, with time, natural language processor 128 can accumulate a number of voice prints from the given user of the set of users 180, which may enable the natural language processor 128 to update/correct predictions made by the first analysis module 130.

Alternative Embodiments—Other Applications

Broadly speaking, embodiments of the present technology can be used for processing spoken utterances with two broad purposes—identification of the user (i.e. correlating the current user with a pre-determined list of users, such as a list of registered users) and authentication of the user (i.e. confirming the identity of the user). More specifically, non-limiting embodiments of the present technology can be used for identification of known users and authentication of guest users (i.e. not-known users).

In some embodiments of the present technology, the first analysis module 130 that can be implemented as the CNN that can be trained in a particular manner, depending on what task the system 100 needs to address, in use—verification and/or authentication.

For the purposes of the CNN implementing the identification task, the CNN is trained to determine a distance from a current vector of the current spoken utterance to vectors of stored voice samples 206.

For the purposes of the CNN implementing the verification task, the CNN is trained in addition to its ability to determine the distance to identify the user, the CNN is further trained to execute the verification of user's identity, for example, by increasing the confidence level threshold, having a secondary confirmation of the user's identity process, etc.

Given the architecture described above it is possible to execute a method of determining a speaker, the speaker selectable from the set of registered users 180 associated with a voice-controllable device (such as the electronic device 104). The method executable by an electronic device configured to execute a Machine Learning Algorithm (MLA).

In some non-limiting embodiments of the present technology, the electronic device can be the electronic device 104 (i.e. the voice-controllable device). In other non-limiting embodiments of the present technology, the electronic device can be the server 106.

Figure 3:
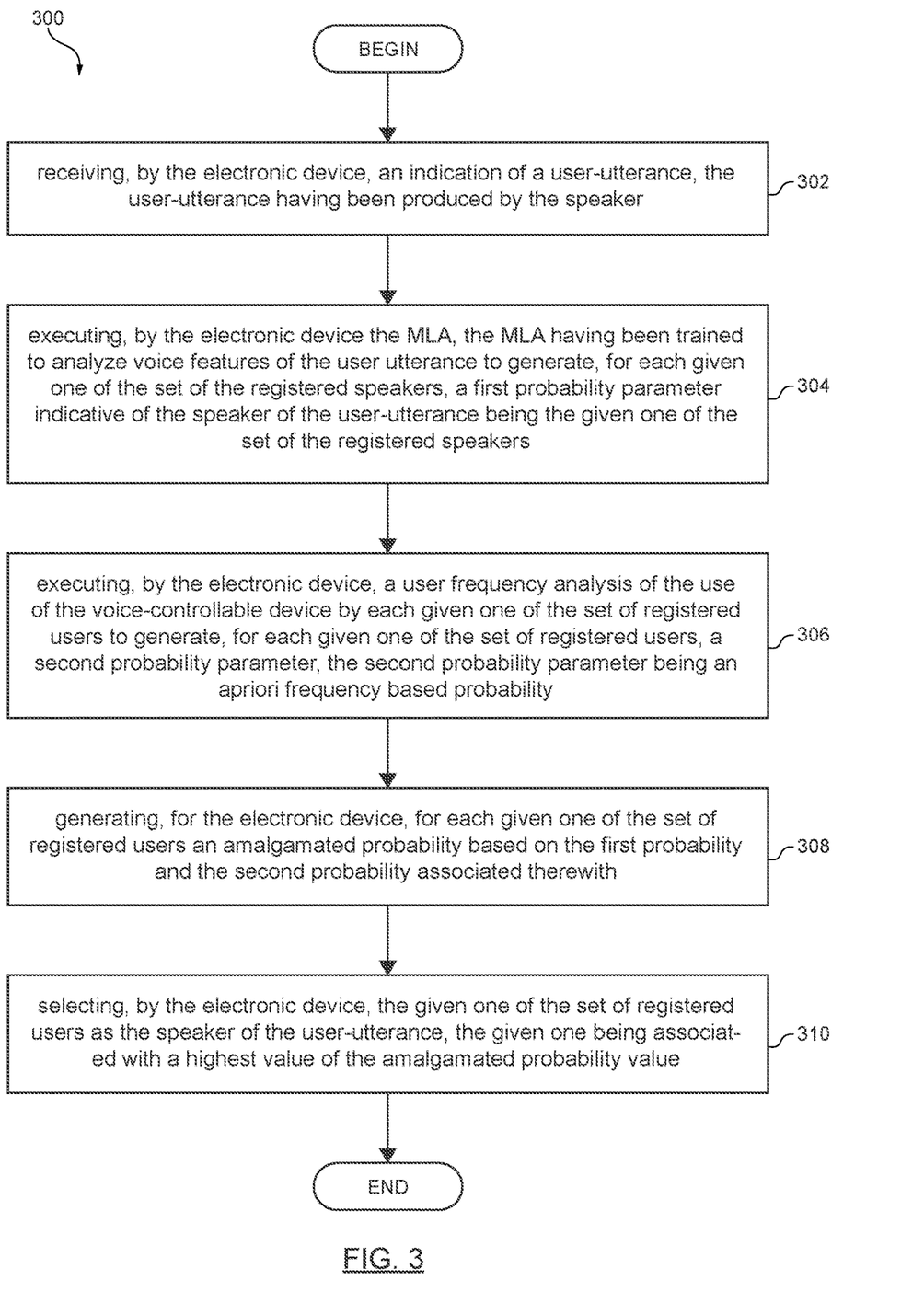
FIG. 3 depicts a block diagram of a flow chart of a method, the method executable in accordance with the non-limiting embodiments of the present technology in the system of FIG. 1.

With reference to FIG. 3, there is depicted a block diagram of a flow chart of a method 300, the method 300 being implemented in accordance with non-limiting embodiments of the present technology. For the purposes of the description of the method 300, it will be assumed that the method 300 is executed by the server 106 and, more specifically, by the speaker determination routine 129.

Step 302—receiving, by the electronic device, an indication of a user utterance, the user utterance having been produced by the speaker The method 300 starts at step 302, where the speaker determination routine 129 receives an indication of a user utterance, the user utterance having been produced by the speaker. This can be executed by virtue of the speaker determination routine 129 receiving the signal 160, the signal 160 containing the recording of the spoken utterance 155 (i.e. indicative of the sound indications 150 having one or spoken utterances produced by one of the set of users 180.

Step 304—executing, by the electronic device the MLA, the MLA having been trained to analyze voice features of the user utterance to generate, for each given one of the set of registered users, a first probability parameter indicative of the speaker of the user utterance being the given one of the set of registered users At step 304, the speaker determination routine 129 executes the MLA, the MLA having been trained to analyze voice features of the user utterance to generate, for each given one of the set of registered users, a first probability parameter indicative of the speaker of the user utterance being the given one of the set of registered users.

Step 306—executing, by the electronic device, a user frequency analysis of the use of the voice-controllable device by each given one of the set of registered users to generate, for each given one of the set of registered users, a second probability parameter, the second probability parameter being an apriori frequency based probability At step 306, the speaker determination routine 129 executes a user frequency analysis of the use of the voice-controllable device (i.e. the electronic device 104 and more specifically the usage of the IPA application 105) by each given one of the set of registered users 180 to generate, for each given one of the set of registered users 180, a second probability parameter, the second probability parameter being an apriori frequency based probability.

In some non-limiting embodiments of the method 300, the user frequency analysis weighs a sub-set of apriori probability for each one of the set of registered users, the sub-set including a pre-determined number of more recent past calculations.

Step 308—generating, for the electronic device, for each given one of the set of registered users an amalgamated probability based on the first probability and the second probability associated therewith At step 308 speaker determination routine 129 generates for each given one of the set of registered users an amalgamated probability based on the first probability and the second probability associated therewith.

Step 310—selecting, by the electronic device, the given one of the set of registered users as the speaker of the user utterance, the given one being associated with a highest value of the amalgamated probability value At step 310, the speaker determination routine 129 selects the given one of the set of registered users as the speaker of the user utterance, the given one being associated with a highest value of the amalgamated probability value.

It should be recalled that the set of users 180, broadly speaking, can have registered users (i.e. those users who have undergone the registration process 200, such as the first user 102 and the set of additional users 182) and guest users. Thus, in some non-limiting embodiments of the method 300, the set of registered users comprises a registered user and a guest user, and wherein the selecting step comprises: comparing the amalgamated probability of each one of the set of registered users 180 to a pre-determined threshold; in response to each one of the amalgamated probabilities being below the pre-determined threshold, determining that the speaker is the guest user; in response to at least one of the amalgamated probabilities being above the pre-determined threshold executing: the selecting the registered user as the speaker of the user utterance, the registered user being associated with the highest value of the amalgamated probability value.

In some non-limiting embodiments of the method 300, the method 300 further comprises: based on the determination of the speaker, updating the apriori frequency based probability associated with each given one of the set of registered users; and storing updated an apriori frequency based probabilities in a memory, such as in the user counter repository 125.

In some non-limiting embodiments of the method 300, the method 300 further comprises retrieving a user profile associated with the speaker and providing the speaker with a set of authorized voice-based actions. For example, the speaker determination routine 129 can retrieve the user profile from the user-record repository 123.

In some non-limiting embodiments of the method 300, the method 300 further comprises retrieving a user profile associated with the one of the guest user and the registered user that has been determined to be the speaker and providing a set of authorized voice-based actions, and wherein the set of voice-based actions associated with the guest user is smaller that the set of voice-based actions associated with the registered user.

In some non-limiting embodiments of the method 300, the method 300 further comprises maintaining a database of apriory probabilities for each one of the set of registered users. As has been alluded to above, the speaker determination routine 129 can maintain the user counter repository 125.

In some non-limiting embodiments of the method 300, the method 300 further comprises updating the apriori probabilities for at least some of the set of registered users based on the selecting, such as updating the user counter repository 125.

In some non-limiting embodiments of the method 300, the set of registered users 180 comprises a registered user and a guest user. In some of these embodiments, the method 300 further comprises setting a pre-determined minimum value of the apriori probability under which the apriori probability for the guest user can not drop. The pre-determined minimum value can be based on a number of registered users of the set of registered users 180. In some of these non-limiting embodiments of the present technology, the pre-determined minimum value is no higher than any one of the apriori probabilities of any of the registered users of the set of registered users 180.

In some non-limiting embodiments of the method 300, the method 300 further comprises maintaining a database of past rendered determined identities of speakers (this can be done, for example, as part of the user counter repository 125 maintained at the database 124).

In some non-limiting embodiments of the method 300, in response to a pre-determined number of past rendered determined identities of speakers being the guest speaker, the method 300 further comprises executing a pre-determined guest scenario. The step of executing the pre-determined guest scenario can comprise, during a future execution of the executing the MLA having been trained to analyze voice features of the user utterance to generate, for each given one of the set of registered users, the first probability of the speaker of the user utterance being the given one of the set of registered users: artificially decreasing the amount of time spent during the generation of the first probability.

In some non-limiting embodiments of the method 300, the method 300 further comprises: retrieving past rendered determined identities of speakers; updating the prediction of the identities of speakers using the current values of apriori probabilities; storing the updated apriori probabilities.

In some non-limiting embodiments of the method 300, the method 300 further comprises comparing the updated apriori probabilities with the past rendered determined identities of speakers and using the determined differences for additional training of the MLA.

Some of the above steps and signal sending-receiving are well known in the art and, as such, have been omitted in certain portions of this description for the sake of simplicity. The signals can be sent/received using optical means (such as a fibre-optic connection), electronic means (such as using wired or wireless connection), and mechanical means (such as pressure-based, temperature based or any other suitable physical parameter based means).

Some technical effects of non-limiting embodiments of the present technology may include provision of a method for more effective (i.e. more likely to be correct) determination of the speaker who has produced a current user-spoken utterance.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a speaker, the speaker selectable from a set of registered users associated with a voice-controllable device, the method executable by an electronic device configured to execute a Machine Learning Algorithm (MLA), the method comprising:

receiving, by the electronic device, an indication of a user utterance, the user utterance having been produced by the speaker;

executing, by the electronic device the MLA, the MLA having been trained to analyze voice features of the user utterance to generate, for each given one of the set of registered users, a first probability parameter indicative of the speaker of the user utterance being the given one of the set of registered users;

executing, by the electronic device, a user frequency analysis of the use of the voice-controllable device by each given one of the set of registered users to generate, for each given one of the set of registered users, a second probability parameter, the second probability parameter being an apriori frequency based probability;

generating, for the electronic device, for each given one of the set of registered users an amalgamated probability based on the first probability and the second probability associated therewith;

selecting, by the electronic device, the given one of the set of registered users as the speaker of the user utterance, the given one being associated with a highest value of the amalgamated probability value; wherein the user frequency analysis weighs a sub-set of apriori probability for each one of the set of registered users, the sub-set including a pre-determined number of more recent past calculations.

2. The method of claim 1, wherein the electronic device is one of the voice-controllable device and a server coupled to the voice-controllable device via a communication network.

3. The method of claim 1, wherein the set of registered users comprises a registered user and a guest user, and wherein the selecting comprises:
   comparing the amalgamated probability of each one of the set of registered users to a pre-determined threshold;
   in response to each one of the amalgamated probabilities being below the pre-determined threshold, determining that the speaker is the guest user;
   in response to at least one of the amalgamated probabilities being above the pre-determined threshold executing:
      the selecting the registered user as the speaker of the user utterance, the registered user being associated with the highest value of the amalgamated probability value.

4. The method of claim 3, the method further comprising:
   based on the determination of the speaker, updating the apriori frequency based probability associated with each given one of the set of registered users; and
   storing updated an apriori frequency based probabilities in a memory associated with the electronic device.

5. The method of claim 1, wherein the method further comprises retrieving a user profile associated with the speaker and providing the speaker with a set of authorized voice-based actions.

6. The method of claim 3, wherein the method further comprises retrieving a user profile associated with the one of the guest user and the registered user that has been determined to be the speaker and providing a set of authorized voice-based actions, and wherein the set of voice-based actions associated with the guest user is smaller that the set of voice-based actions associated with the registered user.

7. The method of claim 1, wherein the method further comprises maintaining a database of apriory probabilities for each one of the set of registered users.

8. The method of claim 7, further comprising updating the apriori probabilities for at least some of the set of registered users based on the selecting.

9. The method of claim 1, wherein the set of registered users comprises a registered user and a guest user, and wherein the method further comprises setting a pre-determined minimum value of the apriori probability under which the apriori probability for the guest user can not drop.

10. The method of claim 9, the setting the pre-determined minimum value is based on a number of registered users of the set of registered users and wherein the pre-determined minimum value is no higher than any one of the apriori probabilities of any of the registered users of the set of registered users.

11. The method of claim 9, wherein the method further comprises maintaining a database of past rendered determined identities of speakers.

12. The method of claim 11, wherein the set of registered users comprises a registered user and a guest user, and wherein in response to a pre-determined number of past rendered determined identities of speakers being the guest speaker, the method further comprises executing a pre-determined guest scenario.

13. The method of claim 12, wherein the executing the pre-determined guest scenario comprises, during a future execution of the executing the MLA having been trained to analyze voice features of the user utterance to generate, for each given one of the set of registered users, the first probability of the speaker of the user utterance being the given one of the set of registered users:
   artificially decreasing the amount of time spent during the generation of the first probability.

14. The method of claim 11, wherein the method further comprises:
   retrieving past rendered determined identities of speakers;
   updating the prediction of the identities of speakers using the current values of apriori probabilities;
   storing the updated apriori probabilities.

15. The method of claim 14, wherein the method further comprises comparing the updated apriori probabilities with the past rendered determined identities of speakers and using the determined differences for additional training of the MLA.

16. An electronic device comprising:
   a processor configured to execute a Machine Learning Algorithm (MLA);
   a memory coupled to the processor, the memory storing computer executable instructions, which instructions when executed cause the processor to:
      receive an indication of a user utterance, the user utterance having been produced by a speaker using a voice-controllable device, the speaker selectable from a set of registered users associated with the voice-controllable device;
      execute the MLA, the MLA having been trained to analyze voice features of the user utterance to generate, for each given one of the set of registered users, a first probability parameter indicative of the speaker of the user utterance being the given one of the set of registered users;
      execute a user frequency analysis of the use of the voice-controllable device by each given one of the set of registered users to generate, for each given one of the set of registered users, a second probability parameter, the second probability parameter being an apriori frequency based probability;
      generate for each given one of the set of registered users an amalgamated probability based on the first probability and the second probability associated therewith;
      select the given one of the set of registered users as the speaker of the user utterance, the given one being associated with a highest value of the amalgamated probability value; wherein the user frequency analysis weighs a sub-set of apriori probability for each one of the set of registered users, the sub-set including a pre-determined number of more recent past calculations.

17. The electronic device of claim 16, the electronic device being one of the voice-controllable device and a server coupled to the voice-controllable device via a communication network.

* * * * *

UNITED STATES PATENT AND TRADEMARK OFFICE
CERTIFICATE OF CORRECTION

| | | |
|---|---|---|
| PATENT NO. | : 11,011,174 B2 | Page 1 of 1 |
| APPLICATION NO. | : 16/534492 | |
| DATED | : May 18, 2021 | |
| INVENTOR(S) | : Ivan Aleksandrovich Karpukhin | |

It is certified that error appears in the above-identified patent and that said Letters Patent is hereby corrected as shown below:

In the Claims

Claim 11 - Line 1, should read "claim 1" – and not "claim 9".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*